United States Patent
Spikes

(10) Patent No.: US 7,387,442 B2
(45) Date of Patent: Jun. 17, 2008

(54) BEARING

(75) Inventor: Hugh Alexander Spikes, London (GB)

(73) Assignee: Imperial Innovations Limited, London (GB)

(*) Notice: Subject to any disclaimer, the term of this patent is extended or adjusted under 35 U.S.C. 154(b) by 113 days.

(21) Appl. No.: 10/509,083

(22) PCT Filed: Mar. 24, 2003

(86) PCT No.: PCT/GB03/01255
§ 371 (c)(1), (2), (4) Date: Sep. 30, 2004

(87) PCT Pub. No.: WO03/083318
PCT Pub. Date: Oct. 9, 2003

(65) Prior Publication Data
US 2005/0105835 A1 May 19, 2005

(30) Foreign Application Priority Data
Mar. 28, 2002 (GB) .................. 0207426.8

(51) Int. Cl.
F16C 32/06 (2006.01)
(52) U.S. Cl. ....................................... 384/276
(58) Field of Classification Search ................ 384/276, 384/280, 286, 307, 311, 322
See application file for complete search history.

(56) References Cited

U.S. PATENT DOCUMENTS
4,322,116 A 3/1982 Heinemann et al.
5,683,183 A 11/1997 Tanaka et al.

FOREIGN PATENT DOCUMENTS
EP 0 141 475 5/1985
GB 1 463 032 2/1977
GB 2 335 536 9/1999
JP 3-41210 2/1991

Primary Examiner—Thomas R Hannon
(74) Attorney, Agent, or Firm—Nixon & Vanderhye P.C.

(57) ABSTRACT

A bearing includes a contact region (2) filled with lubricant (8) between two otherwise rubbing surfaces (4, 6). One surface moves relative to a stationary other. The moving surface entrains the lubricant into the contact region to generate pressure within the lubricant enabling support of a load whilst the lubricant slips against the stationary surface.

27 Claims, 10 Drawing Sheets

BEARING

Figure 1:
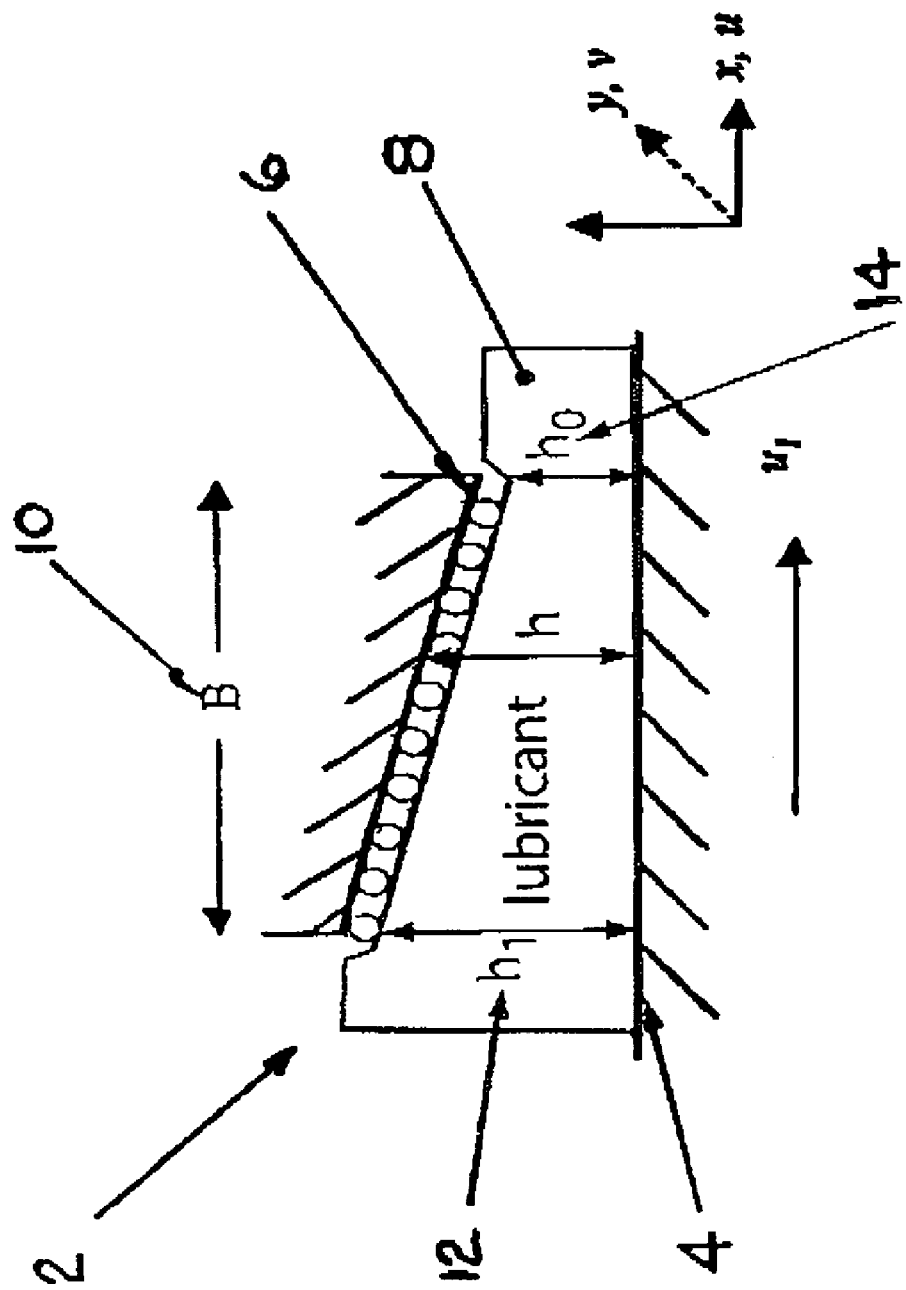

This application is the US national phase of international application PCT/GB03/01255, filed 24 Mar. 2003, which designated the US and claims priority to GB Application No. 0207426.8 filed 28 Mar. 2002. The entire contents of these applications are incorporated herein by reference.

This invention relates to bearings with fluid lubrication.

A basic principle of fluid film lubrication and a cornerstone of the Reynolds equation is that there is no slip of the lubricant against the two, bounding, solid surfaces. The assumption of a "no-slip boundary condition" enables the velocity gradient within the fluid film to be determined, and hence the total lubricant flow and Reynolds equation to be derived.

Based on the no-slip boundary condition, the lubricant film velocity gradient and thus the friction has two components, a Couette-term with linear velocity gradient between the two bounding surfaces and a Poiseuille-term with parabolic velocity gradient due to convergence/divergence of the contact. The Couette friction is usually considerably greater than the Poiseuille friction except in pure rolling conditions where the former is zero since the two surfaces move with equal velocity with respect to the contact.

In conventional engineering components at moderate sliding velocities, Couene shear usually produces relatively small friction coefficients, typically 0.001 in hydrodynamic bearings.

However, the magnitude of Couette friction varies inversely with film thickness so that in lightly-loaded contacts with thin lubricant films, such as, for example, those present in microelectromechanical systems (MEMs), or other small, high precision machines, the friction force can approach and exceed the applied load, leading to unacceptably high friction coefficients.

Chappuis (Ref 1) discloses a hydrodynamic journal bearing lubricated by mercury, in which the lubricant wets neither the journal nor the shaft. The bearing disclosed by Chappuis adopts indents to form retention zones in which the mercury drops rest. The resulting non-wetting interaction provides low friction coefficient due to shearing at the mercury/steel interface. The disclosed bearing can operate in the fluid film regime and load support is analysed in terms of surface tension via the Laplace pressure of the non-wetting lubricant film. In this case, contact pressure was found to be inversely proportional to the fluid film thickness and to be most relevant to high conformity animal or human joint contacts. The bearing arrangement considered by Chappuis was one of a fully non-wetting system. It is important that a bearing should inherently serve to retain its lubricating fluid in place between the relatively moving solid surfaces.

Hiratsuka et al (Ref 2) discloses a system involving two PTFE-coated flats lubricated by water and the measurement of the friction force produced in reciprocating contact between them. As in the previous case, the lubricant (water) does not wet either of the surfaces (PTFE) therefore to enable partial wetting a small area of one surface was left uncoated. The system was found to yield a very low coefficient of friction and load support was considered due to surface tension.

More recently, Hild et al (Ref 3) disclosed a water-lubricated system comprising a silicon ball reciprocated at a fixed gap against a silicon flat immersed in water. Here friction was measured as a function of the surface separation. Silicon, unlike PTFE in the previous case, is hydrophilic therefore in this case the flat surface was chemically treated to make it hydrophobic, thus non-wetting. It was found that friction between the hydrophobic/hydrophilic pair became progressively less than that of the hydrophilic/hydrophilic pair. It was suggested that this reduction was due to slip of the water against the hydrophobic layer and thus reduced the viscous force.

A significant barrier to the development of very small-scale machines such as micro-electromechanical systems (MEMs) is the problem of achieving effective lubrication of their moving parts. This is because, as machines are scaled down, the two dimensional factors that control friction, such as adhesion in solid/solid contacts or lubricant shear in lubricated contacts, tend to fall less rapidly than three-dimensionally-controlled ones such as inertia and load. This means that the forces resisting the relative motion of tiny moving parts in such machines can approach or exceed the forces that drive motion.

According to one aspect this invention provides a bearing comprising a first bearing surface separated by a gap having a convergent region and containing fluid from a second bearing surface, wherein, in use, said first bearing surface moves relative to said convergent region so as to entrain said fluid into said convergent region whereby said second bearing surface slips relative to said fluid and pressure within said fluid between said first bearing surface and said second bearing surface supports a load applied between said first bearing surface and said second bearing surface.

This provides a bearing in the form of liquid lubricated contact between two rubbing, solid surfaces. The lubricant slips at one surface, resulting in low friction, whilst at the same time the lubricant is entrained into the convergent region by the moving other surface to form a separating, load supporting film. It will be appreciated that it is the relative motion of the surfaces that is important. The first bearing surface could be moving with the second bearing surface stationary, the first bearing surface stationary with the second bearing surface moving or even both bearing surfaces moving with different velocities.

In preferred embodiments the bearing is formed with a first bearing surface which is wetted by the fluid, such that the fluid will be entrained into contact by the wetted surface to form a separating film. The wetted first bearing surface inherently acts to entrain the fluid into the convergent region and hold it within the bearing.

In preferred embodiments the bearing is formed with a second bearing surface, which is substantially non-wetted by the fluid, such that the fluid may slip at the non-wetted surface, resulting in low friction. It will be appreciated that substantially non-wetting does not mean that the contact angle must be 180°, but rather that the surface is sufficiently non-wetted ("partially wetted") such that slipping can occur, e.g. slipping can still occur at contact angles below 50° C. at smooth surfaces.

In preferred embodiments the surface roughness of the second surface has a root mean square value less than 0.01 µm measured using an upper cut-off length of 1 micron. This helps the fluid slip at the second surface.

Whilst it will be appreciated that the principle of the present invention may be applied to a wide variety of different types and configurations of bearings, it is particularly well suited for use in a thrust bearing or a journal bearing.

Whilst the fluid could take a variety of forms, in preferred embodiments the fluid is an oil or an oil with an additive to provide the desired properties for the bearing surfaces. In this case, the first bearing surface is preferably oleophilic so as to be wetted and the second bearing surface oleophobic so as to be non-wetted.

Alternative preferred fluids include water, glycerol, an ionic fluid or a synthetic lubricant such as an ester or ether.

Advantageously in a bearing with a non-wetted contact surface, capillarity, in which a lubricant is drawn into narrow gaps around a contact by surface tension, is reduced. In non-fully immersed systems, capillary effects both increase the load experienced by the contact and provide additional resistance to viscous shear.

Preferably the fluid forms a film disposed upon the first bearing surface, to provide an effective lubricant supply method.

Alternatively the bearing may be immersed in the fluid, as in some applications this may be a more desirable arrangement.

Whilst the bearings may find many different uses (e.g. use in macro-scale systems such as engines and transmissions to reduce friction as a low friction slider bearing), they are particularly well suited for use in systems where the second bearing surface forms part of a data access head, which is operable to access data stored on a movable data storage media, the first bearing surface preferably being a part of the data storage media.

In this context, preferably the movable data storage medium is a magnetic disc and the data access head is a magnetic disc data access head.

Another application to which the bearings are particularly well suited is where the bearing is part of an electromechanical system or a microelectromechanical system, in which the first bearing surface forms part of a first moving component and the second bearing surface forms part of a stationary component.

In preferred embodiments the second bearing surface has a surface energy corresponding to less than 0.05 J/m$^2$, a range found applicable to non-wetting surfaces such as a polymer, a fluorinated surfactant coating or a hydrocarbon surfactant coating.

It will be appreciated that the first and second bearing surfaces may be formed from bulk material, surface treatments, coatings or combinations thereof.

In preferred embodiments the fluid has a surface tension higher than a critical surface tension of the second bearing surface. The relative difference in surface tension makes it more likely that the fluid and the second bearing surface will properly and freely slip in relation to each other.

The surface materials and fluid combination are highly desirably chosen in order that the first surface has the desired wetting properties and the second surface has the desired non-wetting properties relative to the fluid.

Viewed from another aspect, the invention provides a bearing comprising a wettable surface moveable in relation to and separated by a gap from a substantially non-wettable surface, said gap having a convergent region and an intermediate lubricant layer therein, said intermediate lubricant layer adhering at a first interface to said wettable surface and non-adhering at a second interface to said substantially non-wettable surface.

Preferably, in use, the movement of the wettable surface entrains the lubricant layer into the convergent region to generate a pressure within the intermediate layer to support a load.

Preferably, in use the movement of the wettable surface results in slipping between the second interface of the lubricant layer and the non-wettable surface.

Viewed from a further aspect the invention provides a half-wetted bearing.

Figure 2:
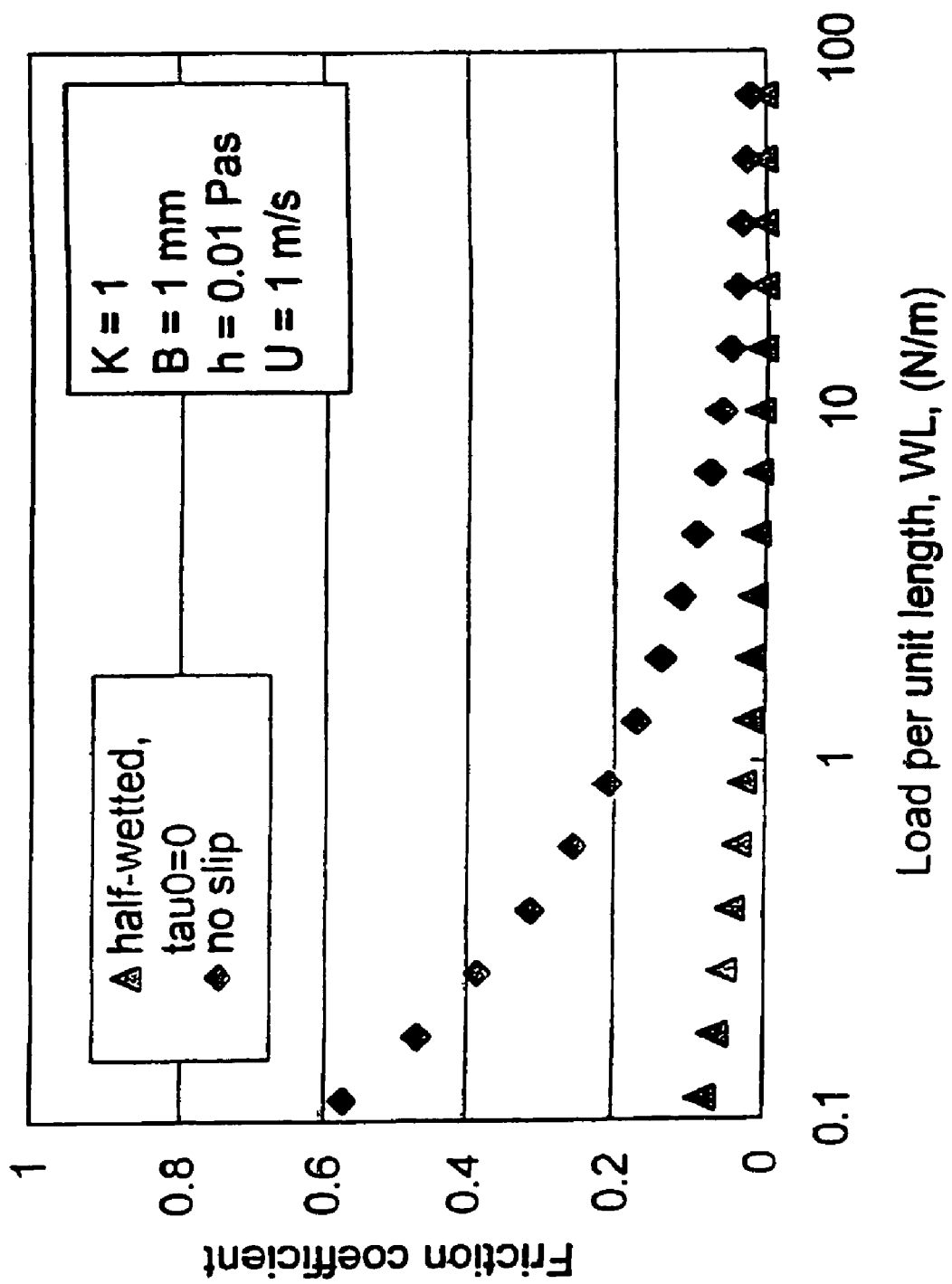
Figure 4:
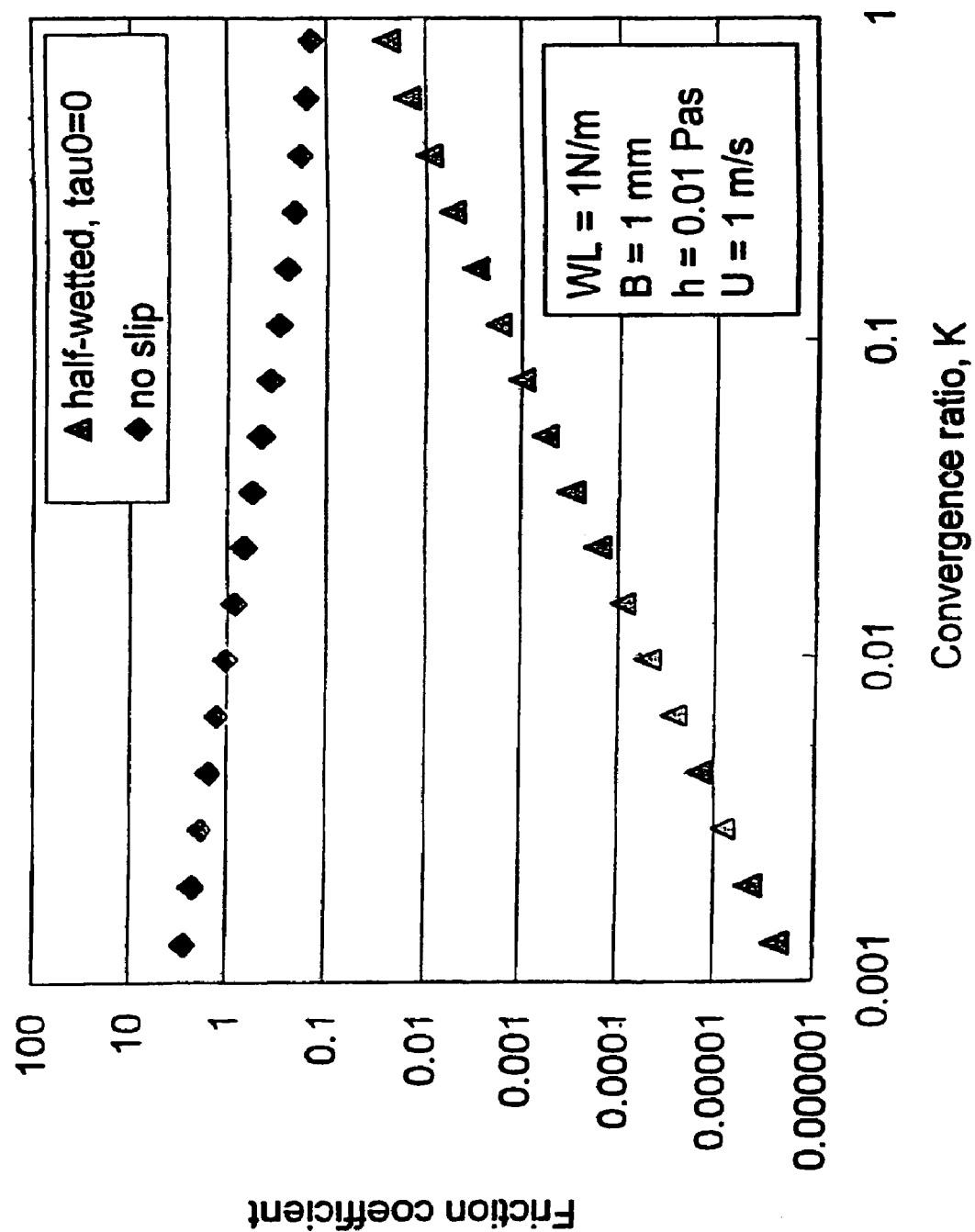
Figure 5:
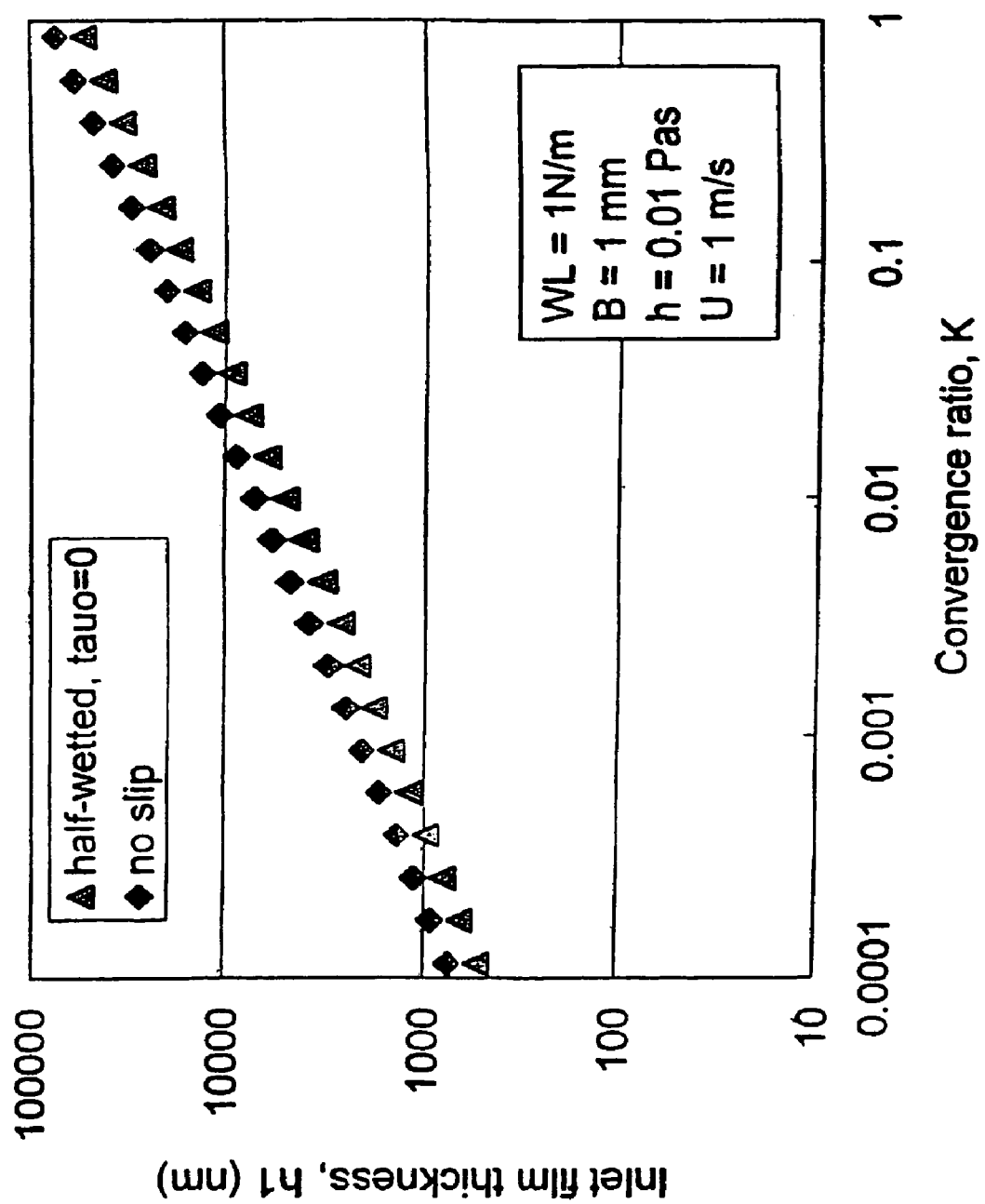
Figure 6:
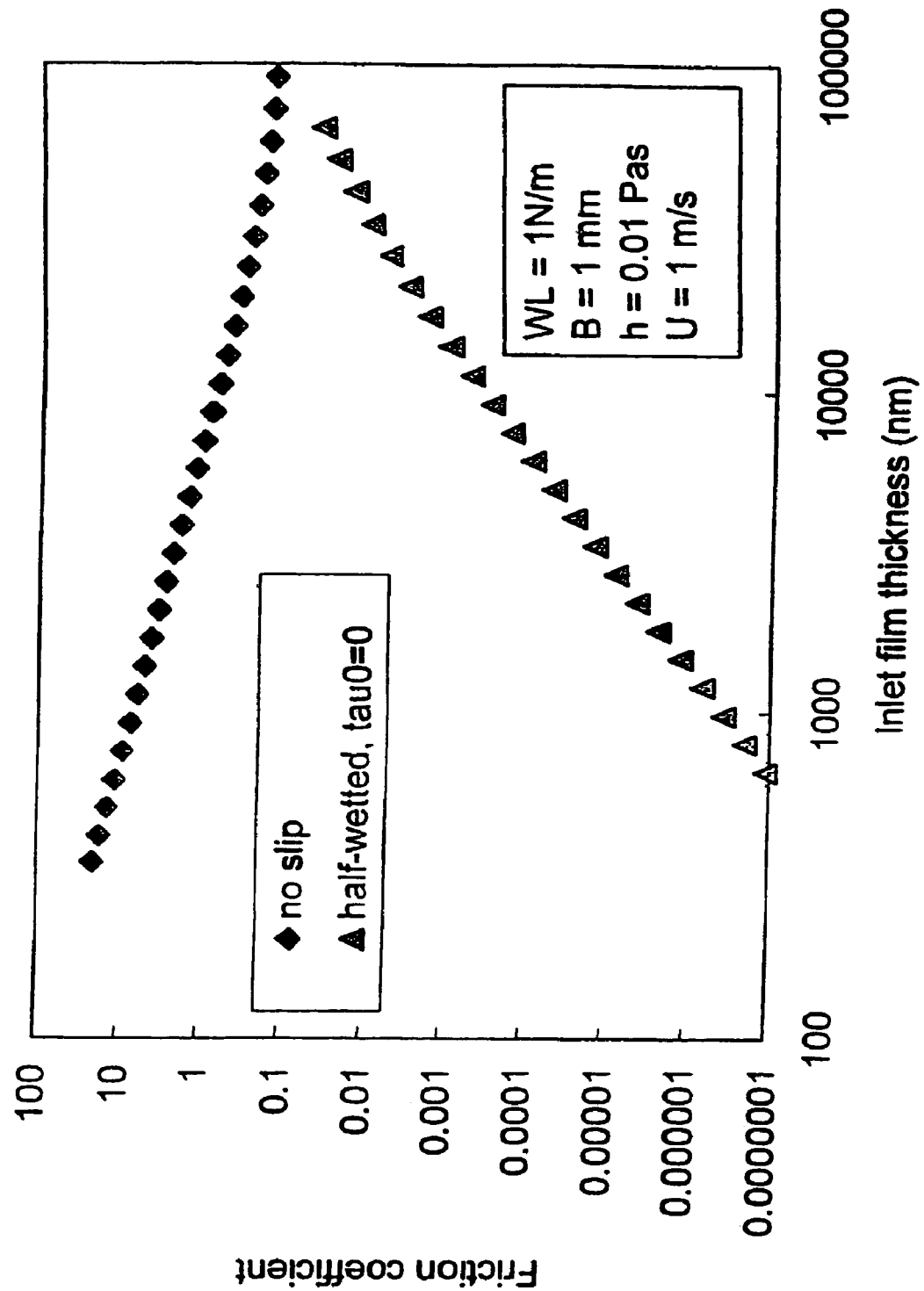
Figure 7:
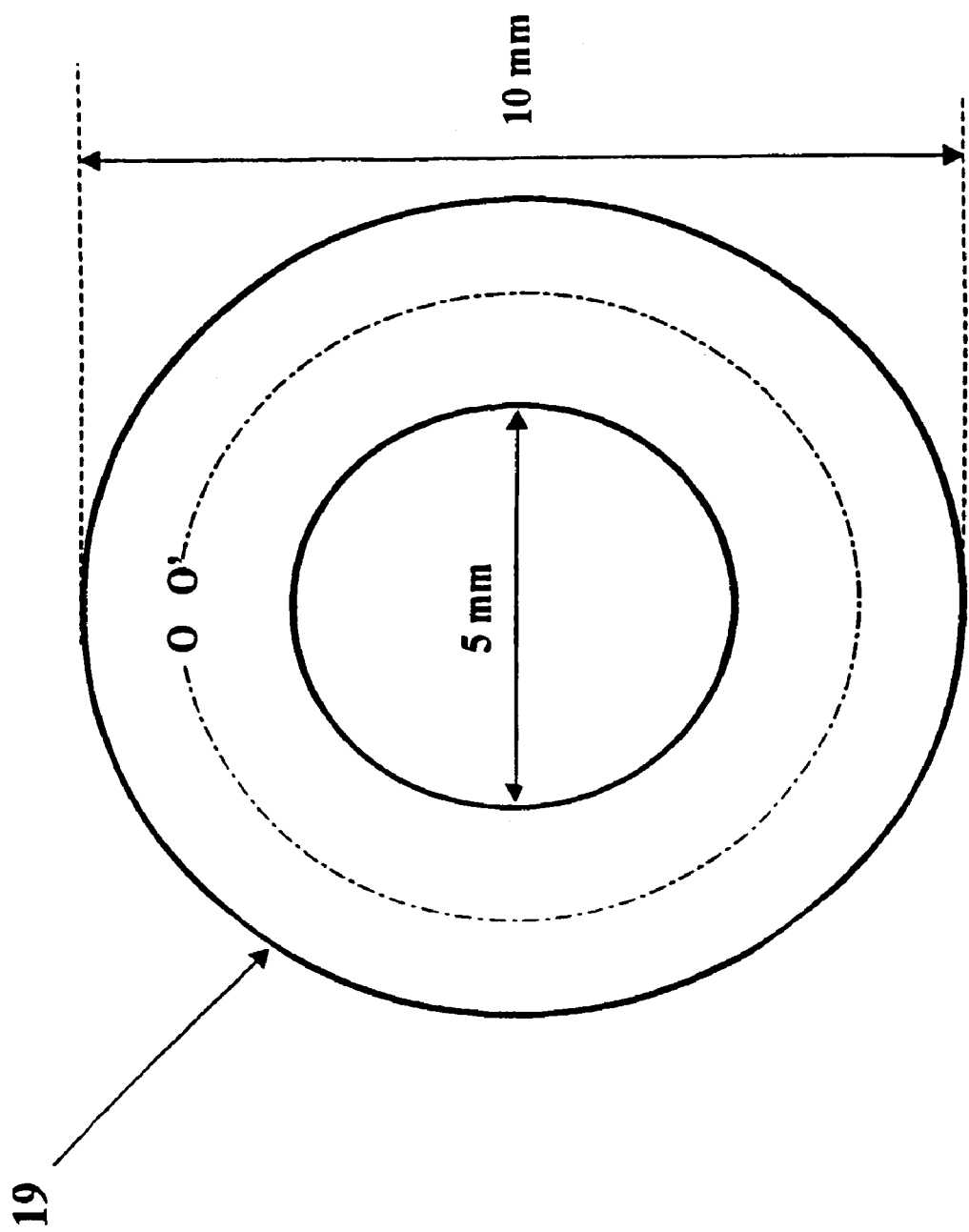
Figure 8:
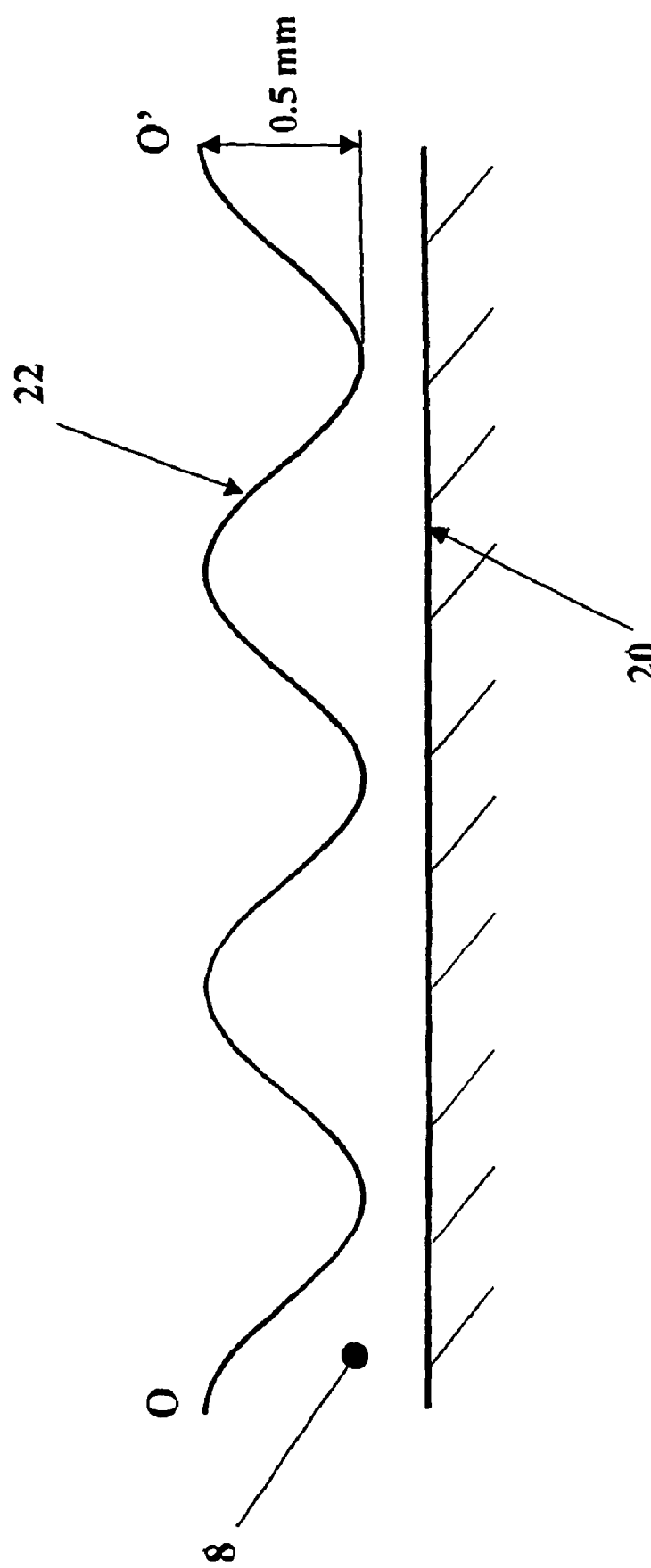
Figure 9:
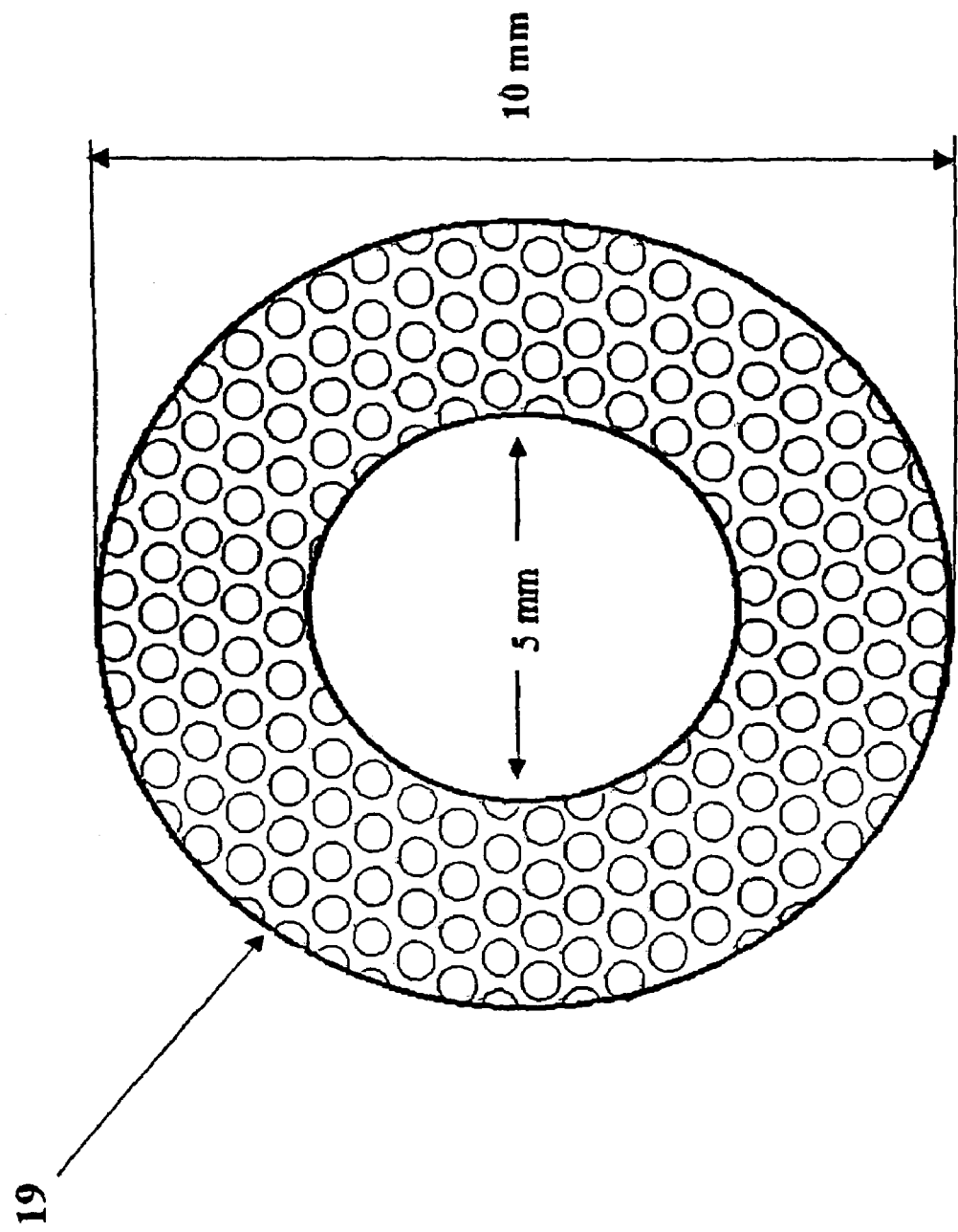
Figure 10:
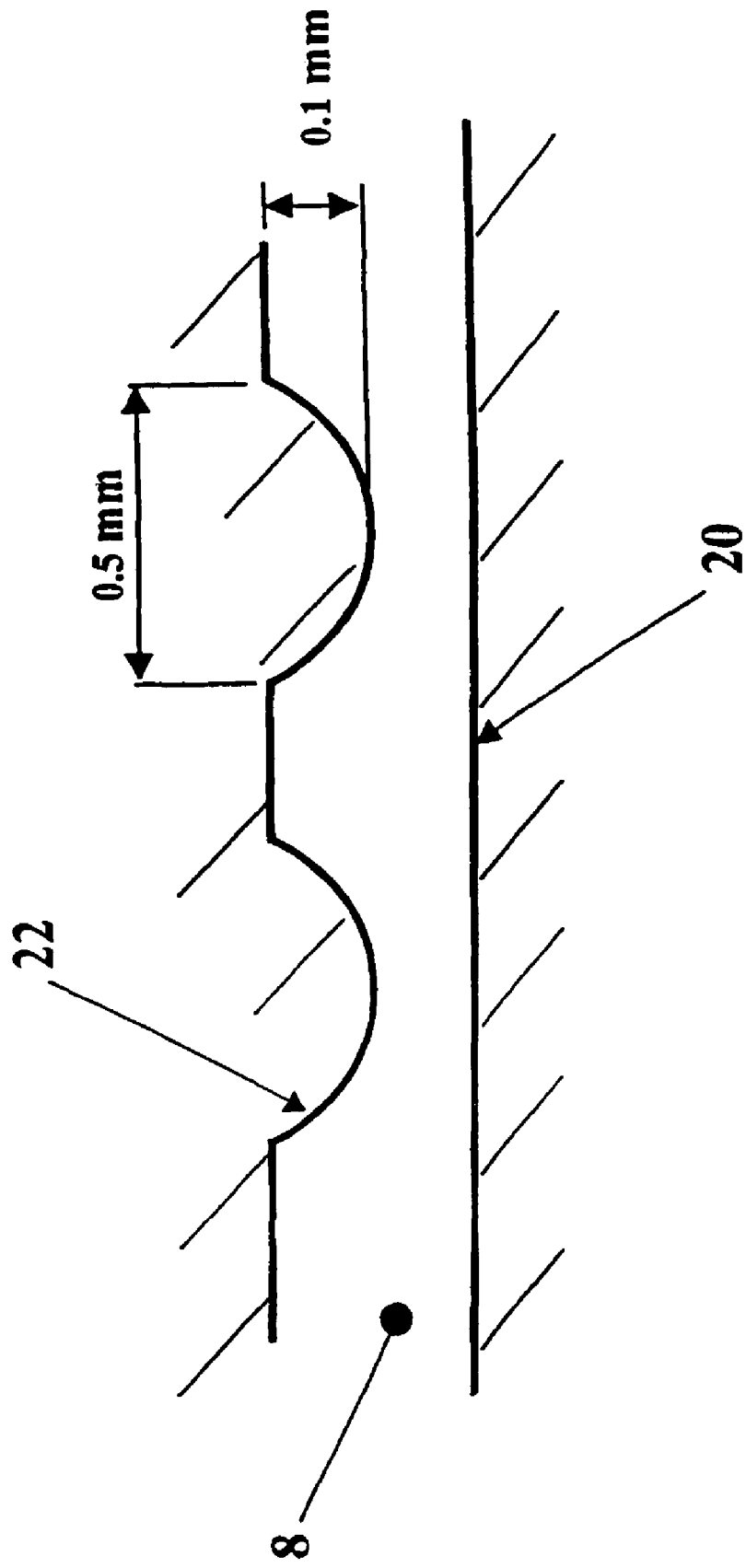

Preferred embodiments of the invention will now be described with reference to the accompanying drawings in which:

FIG. 1 schematically represents a one-dimensional half-wetted bearing;

FIG. 2 graphically illustrates the relationship between friction coefficient and applied loads for a half-wetted bearing and a no-slip bearing;

FIG. 3a to 3d schematically represent a one-dimensional bearing with varying moving surfaces;

FIG. 4 graphically illustrates the variation in friction coefficient with convergence ratio for a half-wetted bearing and a no-slip bearing;

FIG. 5 graphically illustrates the effect of inlet film thickness on the convergence ratio;

FIG. 6 graphically illustrates the relationship between friction coefficient and inlet film height;

FIG. 7 schematically represents a plan view of a thrust washer;

FIG. 8 schematically represents an elevation view of the thrust bearing of FIG. 7 showing a sinusoidal surface finish of a non-wetting stator surface;

FIG. 9 schematically represents a plan view of a non-wetting stator surface defined by spherical sector protuberances;

FIG. 10 schematically represents an elevation view of the non-wetting stator surface of FIG. 9 showing the surface finish.

Referring to FIG. 1 there is depicted an example bearing in the form of a simple linear wedge 2. The wedge 2 comprises a wetted surface represented by a lower flat 4, which is loaded and moving with velocity $u=u_1$ relative to a non-wetting, stationary, upper surface 6, which is tilted to provide a convergent/divergent contact region. A liquid 8 having dynamic viscosity $\eta$ lubricates the contact region. A one-dimensional bearing, implying that the bearing is infinitely long in the y-direction is depicted, with width B 10 in the sliding direction, inlet and outlet film thickness $h_1$ 12 and $h_0$ 14 respectively and a shear stress $\tau_0=0$.

A two-dimensional analysis is presented, to retain the possibility of motion and film thickness variation in the y-direction.

Analysis of the type represented by Reynolds equation is applied; in this case the assumption of no-slip boundary condition is precluded.

Reynolds equation is often derived from the equations of equilibrium of an element of fluid to yield $$\frac{\partial \tau_{xz}}{\partial z} = \frac{\partial p}{\partial x} \quad \text{Equation 1a}$$

$$\frac{\partial \tau_{yz}}{\partial z} = \frac{\partial p}{\partial y} \quad \text{Equation 1b}$$

where $\tau$ is the shear stress and p is the pressure. In the derivation of Reynolds equation the expression for shear stress, $$\tau = \eta \frac{\partial u}{\partial z},$$

where $\eta$ is the fluid dynamic shear viscosity and is substituted into Equation 1 to provide an equation for the second differential of the velocity gradient in the fluid.

$$\frac{\partial}{\partial z}\left(\eta \frac{\partial u}{\partial z}\right) = \frac{\partial p}{\partial x} \quad \text{Equation 2}$$

By substituting the terms associated with a no-slip boundary condition; $u=u_1$ at $z=0$ and $u=0$ (or $u=u_2$ if the upper surface is moving) at z=h, equation 2 is integrated twice to yield an equation representative of velocity profile for the fluid bound by the two surfaces. The assumption in Reynolds equation is that the viscosity $\eta \neq f(z)$, but Dowson (Ref. 4) has shown that variation of the viscosity through the thickness of the film yields a generalised Reynolds equation.

Where slip occurs at an interface, the fluid velocity adjacent to the solid surface is not known. It is assumed, for the purpose of analysis that at the interface the fluid experiences a fixed shear stress $-\tau_0$ in the x-direction, which is a negative quantity due to flow resistance at the solid surface and at the extreme of perfect slip, $\tau_0=0$. Therefore, integration of Equation 1a yields $$\tau = \frac{\partial p}{\partial x} z + c_1 \qquad \text{Equation 3}$$

and assuming $\tau=\tau_0$ at $z=h$ $$\tau = \frac{\partial p}{\partial x}(z-h) - \tau_0 \qquad \text{Equation 4}$$

substitution of $$\tau = \eta \frac{\partial u}{\partial z}$$

is made at this stage such that $$\eta \frac{\partial u}{\partial z} = \frac{\partial p}{\partial x}(z-h) - \tau_0 \qquad \text{Equation 5}$$

Assuming that $\eta \neq f(z)$ and integrating provides $$u = \frac{1}{\eta}\frac{\partial p}{\partial x}\left(\frac{z^2}{2} - hz\right) - \frac{\tau_0}{\eta}z + c_2 \qquad \text{Equation 6}$$

Application of the boundary conditions at the wetted surface of $u=u_1$ at $z=0$ yields, in the x-direction $$u = \frac{1}{\eta}\frac{\partial p}{\partial x}\left(\frac{z^2}{2} - hz\right) - \frac{\tau_0}{\eta}z + u_1 \qquad \text{Equation 7a}$$

and similarly in the y-direction $$v = \frac{1}{\eta}\frac{\partial p}{\partial y}\left(\frac{z^2}{2} - hz\right) - \frac{\tau_{0y}}{\eta}z + v_1 \qquad \text{Equation 7b}$$

When $$\frac{\partial p}{\partial x} = 0$$

such is the case between two parallel surfaces or at the location of maximum pressure in the bearing, the expression for fluid velocity at the slipping surface is $$u_s = u_1 - \frac{\tau_0 h}{\eta}.$$

Derivation of fluid velocity for the slipping condition enables the analysis to proceed in a similar manner to Reynolds equation to derive the pressure equations for a half-wetting bearing.

The velocities in the x and y directions corresponding to equations 7a and 7b are integrated across the thickness of the film to yield the flow through a column of fluid in the x-direction $$q_x = \int_0^h u\,dx \qquad \text{Equation 8}$$

$$q_x = -\frac{1}{3}\frac{\partial p}{\partial x}\frac{h^3}{\eta} - \frac{\tau_0 h^2}{2\eta} + u_1 h \qquad \text{Equation 9}$$

Differentiation of Equation 9 provides the flow differential in the x-direction (Equation 10a) and similarly in the y-direction (Equation 10b).

$$\frac{\partial q_x}{\partial x} = -\frac{1}{3}\frac{\partial}{\partial x}\left(\frac{\partial p}{\partial x}\frac{h^3}{\eta}\right) - \frac{1}{2}\frac{\partial}{\partial x}\left(\frac{\tau_0 h^2}{\eta}\right) + u_1 \frac{\partial h}{\partial x} \qquad \text{Equation 10a}$$

$$\frac{\partial q_y}{\partial y} = -\frac{1}{3}\frac{\partial}{\partial y}\left(\frac{\partial p}{\partial y}\frac{h^3}{\eta}\right) - \frac{1}{2}\frac{\partial}{\partial y}\left(\frac{\tau_{0y} h^2}{\eta}\right) + v_1 \frac{\partial h}{\partial y} \qquad \text{Equation 10b}$$

Based on continuity of flow and assuming no supply of lubricant in the z-direction $$\frac{\partial q_x}{\partial x} + \frac{\partial q_y}{\partial y} = 0 \qquad \text{Equation 11}$$

By substitution of equations 10a and 10b into equation 11, equation 12 is derived. Furthermore for the case of an infinitely long bearing and assuming that viscosity does not vary across the bearing area equation 12 reduces to equation 13.

$$\frac{\partial}{\partial x}\left\{\frac{h^3}{\eta}\frac{\partial p}{\partial x}\right\} + \frac{\partial}{\partial y}\left\{\frac{h^3}{\eta}\frac{\partial p}{\partial y}\right\} + \\ \frac{3}{2}\left(\frac{\partial}{\partial x}\left\{\frac{\tau_0 h^2}{\eta}\right\} + \frac{\partial}{\partial y}\left\{\frac{\tau_{0y} h^2}{\eta}\right\}\right) = 3\left\{u_1 \frac{\partial h}{\partial x} + v_1 \frac{\partial h}{\partial y}\right\} \qquad \text{Equation 12}$$

$$\frac{d}{dx}\left\{h^3 \frac{dp}{dx}\right\} + \frac{3}{2}\frac{d}{dx}\{\tau_0 h^2\} = 3u_1 \eta \frac{dh}{dx} \qquad \text{Equation 13}$$

With the exception of the $\tau_0$ term the pressure equations, equation 12 and equation 13, are similar to the corresponding Reynolds equations. At the limit $\tau_0=0$ the right hand terms of equations 12 and 13 are one half of those terms in the corresponding Reynolds equation. Therefore the analysis implies that for $\tau_0=0$, the pressure and consequent load support of a bearing with slip at one surface is half that of a conventional no-slip bearing. Close agreement in form of equations 12 and 13 with Reynolds equation implies that analysis of pressure and load for hydrodynamic bearings of varying configurations is transferable to the half-wetted bearing case.

Thus, an infinitely long wedge as depicted in FIG. 1, has a pressure distribution of similar form (with half the magnitude) as the corresponding no-slip bearing derived by Reynolds equation.

$$p = \frac{3u_1\eta B}{h_0^2 K}\left(\frac{1}{\left(1+K\frac{Kx}{B}\right)} - \frac{1}{\left(1+K\frac{Kx}{B}\right)^2}\left(\frac{K+1}{K+2}\right) - \frac{1}{(K+2)}\right) \quad \text{Equation 14}$$

where the contact region shape is $$h = h_0\left(1+K-\frac{Kx}{B}\right)$$

and the convergence ratio is defined as $$K = \frac{h_1}{h_0} - 1.$$

Similarly the load support per unit length, $W_L$ for a half-wetted bearing with $\tau=0$ is half that of the no-slip bearing.

$$W_L = \frac{3u_1\eta B^2}{h_0^2 K^2}\left(\log_e(K+1) - \frac{2K}{K+2}\right) \quad \text{Equation 15}$$

Integrating the shear stress over the lower bearing surfaces derives friction in a half-wetted bearing $$F = \int_0^y \int_0^x \tau\, dx\, dy \quad \text{Equation 16}$$

Substitution for $\tau$ from equation 3 in equation 16 provides $$F = \int_0^y \int_0^x \left(\frac{\partial p}{\partial x}(z-h) - \tau_0\right) dx\, dy \quad \text{Equation 17}$$

Therefore, for the lower wetted surface, this yields $$F_x = \int_0^y \int_0^x \left(-\frac{\partial p}{\partial x}h - \tau_0\right) dx\, dy \quad \text{Equation 18}$$

For the upper, non-wetted surface the friction appears at first sight to be the integral of $\tau_0$ over the bearing area, but the influence of the resolved pressure against the slope of the surface must also be accounted for (Ref 5)

For the one-dimensional bearing of width B 10, equation 18 reduces to an expression for the friction per unit length, $F_L$;

$$F_L = \int_0^B \left(-\frac{\partial p}{\partial x}h - \tau_0\right) dx \quad \text{Equation 19}$$

integration by parts, of which yields $$F_L = [-ph]_0^B + \int_0^B p\frac{dh}{dx}dx - \int_0^B \tau_0\, dx \quad \text{Equation 20}$$

The first term disappears where p=0 at the inlet and outlet of the bearing. For a linear wedge with inlet and outlet film thickness $h_1$ 12 and $h_0$ 14, and $$K = \frac{h_1}{h_0} - 1, \frac{dh}{dx}$$

has a constant value of $$\frac{-h_0 K}{B}.$$

Therefore, $$F_L = \frac{h_0 K}{B}\int_0^B p\,dx - \int_0^B \tau_0\, dx \quad \text{Equation 21}$$

$$F_L = -\frac{h_0 K W_L}{B} - \int_0^B \tau_0\, dx \quad \text{Equation 22}$$

Equation 22 is in contrast with equation 23 resulting from a no-slip Reynolds analysis when applied to an example bearing of the same dimensions.

$$F_L = -\frac{h_0 K W_L}{2B} - \frac{u_1 \eta B \log_e(1+K)}{h_0 K} \quad \text{Equation 23}$$

where $$\frac{h_0 K W_L}{2B}$$

is the Poiseuille term and $$\frac{u_1 \eta B}{h_0}\frac{\log_e(1+K)}{K}$$

is the Couette friction term.

Comparison of equations 22 and 23 identifies that, in a half-wetted bearing the Poiseuille friction term is double that of the Reynolds case and the Couette friction term has been replaced by a factor dependent on shear stress, $\tau_0$.

In conventional, no-slip hydrodynamic bearings, the Couette friction term is considerably larger than the Poiseuille friction term. This can be shown by dividing equation 23 by $W_L$ for the no-slip case to obtain the friction coefficient of the no-slip bearing.

$$\mu = \frac{h_0 K}{2B} + \frac{h_0 K}{6B} \frac{\log_e(K+1)}{\left(\log_e(K+1) - \frac{2K}{K+2}\right)} \quad \text{Equation 24}$$

$$\mu = \frac{h_0 K}{2B}\left(1 + \frac{\log_e(K+1)}{3\left(\log_e(K+1) - \frac{2K}{K+2}\right)}\right) \quad \text{Equation 25}$$

In equation 25, for a convergence value, K=1, typical of linear wedge bearings, the Poiseuille friction term is about ten percent of the Couette friction term, whilst for a value K=0.1 the relationship is half a percent. For the half-wetted bearing, referring to equation 22, at the limit of $\tau_0$=0, the friction coefficient of the half wetted bearing is $$\frac{h_0 K}{B}$$

and is thus approximately twenty percent of the corresponding friction for the no-slip bearing when K=1 and reduces to one percent when K=0.1.

FIG. 2 illustrates the comparison of friction coefficients, plotted against load $W_L$, for two bearings under the same operating conditions. One bearing is the half-wetted type and the other is a conventional no-slip bearing. It is clear from FIG. 2 that the friction coefficient increases more rapidly at low loads for the no-slip bearing compared with the half-wetted bearing due to the effects of the Couette friction term in the no-slip case. Hence at the extreme slip condition of $\tau_0$=0 at a stationary surface a fully flooded half-wetted bearing has half the load support and a small fraction of the friction coefficient of the corresponding Reynolds bearing.

Interfacial slip is assumed to occur at a critical shear stress, $\tau_0$ thus providing the fluid boundary condition at the slipping surface. This is an imposed boundary condition with the flow properties being determined by $\tau_0$ and the velocity of the wetted surface. If the absolute value of the shear stress generated when no slip takes place is less than the critical shear stress, $\tau_0$ then it can be assumed that no slip takes place.

For the case where fluid slips over the whole solid surface and everywhere in the same direction the load support and friction expressions as defined in equations 13 and 22 are integrated to give equations 26 and 27, the ratio of which provides the friction coefficient.

$$W_L = \frac{3u_1\eta B^2}{h_0^2 K^2}\left(\log_e(K+1) - \frac{2K}{K+2} + \frac{\tau_0 h_0}{2u_1\eta}\left(2\left(\frac{K+1}{K+2}\right)\log_e(K+1) - K\right)\right) \quad \text{Equation 26}$$

$$F_L = -\frac{h_0 K W_L}{B} - \tau_0 B \quad \text{Equation 27}$$

Load and friction-support thus far relate to a bearing of infinite length in the y-direction. The equations are equally valid for the case of the practical, finite length, bearing, however side leakage must be accounted for. Consequently, the load bearing capacity of the finite length bearing is less than that of the infinite case, such that for square bearing surfaces, where L=B, the load support, $W_L$ equates to less than half of the infinite length case.

Figure 3:
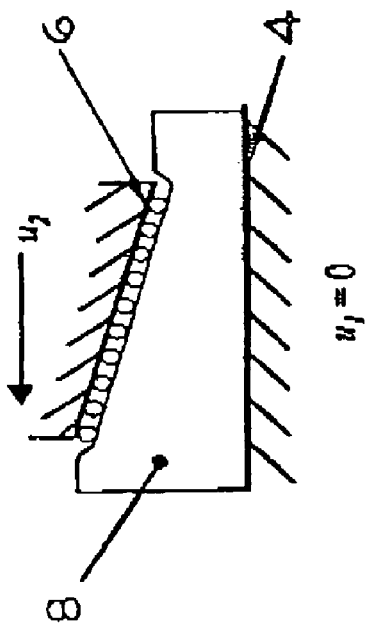
Figure 3:
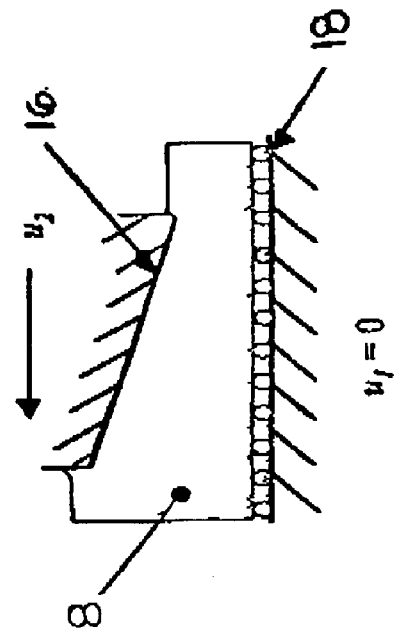
Figure 3:
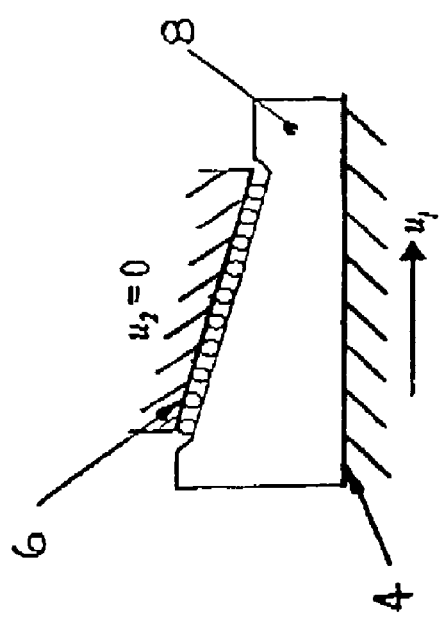
Figure 3:
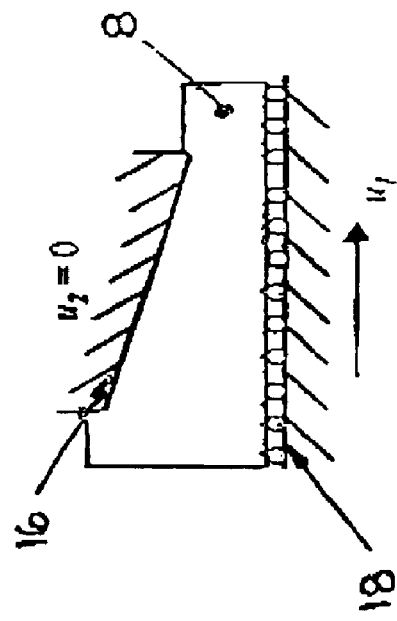

The above analysis identifies that the lubricant 8 can be entrained into a sliding contact even when it slips against one of the solid surfaces. Four possible configurations of bearing movement are illustrated in FIG. 3. FIG. 3a illustrates a moving wetted surface 4 (e.g., data storage media) relative to a stationary non-wetted surface 6 (e.g., a data access head) corresponding to the infinitely long bearing illustrated in FIG. 1. FIG. 3b depicts the same bearing arrangement as FIG. 3a but in this case non-wetting surface 6 moves relative to a stationary wetted surface 4. FIGS. 3c and 3d depict a bearing with the inclined surface 16 representing the wetted surface and the lower flat surface 18 being the non-wetted surface. In FIG. 3c the non-wetted flat surface 18 moves relative to a stationary wetted wedge surface 16 and FIG. 3d depicts the wetted wedge surface 16 moving relative to a stationary non-wetted flat surface 18. Lubricant entrainment and consequent load support occurs when the wetted, no-slip surface 4 moves relative to the bearing. Of the four examples illustrated by FIG. 3 load bearing capacity is possible even when $\tau_0$=0 in those cases depicted by FIGS. 3a and 3b in which movement of the surface 4 or 6 towards the converging zone results in entrainment of the lubricant 8. The no-slip boundary condition requires that $u_1$ is some finite value with respect to the convergent zone, otherwise the right hand term in equation 12 and consequent pressure is zero, that is the bearing has negligible load bearing capacity.

Lubricant supply may be provided by a fully flooded system or by a thin film. The fully flooded system is one where the bearing surfaces are fully immersed or copiously lubricated and the thin film system, as implied, is where a thin film of lubricant is deposited on the wetted surface.

In a fully flooded environment the bearing is filly immersed and the film thickness between the contact surfaces is determined by the bearing operating conditions affected by load, wetted surface velocity, lubricant viscosity and the bearing dimensions. The convergence ratio being generally self-adjusting as in the case of a tilting pad or journal type bearing. Fully flooded lubrication is commonly found in macro-scale plain bearings where convergence ratios of one or more provide optimum load support. In some low load applications parallel plate type bearings may be applied, in which the convergence ratio is established by thermal or deformation effects or minor deviations from perfect flatness arising in manufacture.

When a thin film of lubricant is deposited on the wetted surface and the film. thickness is controlled by the available inlet thickness $h_1$ two types of bearing are possible. If the bearing can tilt and so K can vary, the load support expression defined by equation 26 is valid for thin film lubrication, but the convergence ratio may adjust to reduce the load support to that actually experienced. The convergence ratio will approach zero in the case of a tilting bearing at low loads with thin deposited oil film.

For a half-wetted bearing (a bearing with one surface wetted by a lubricant and the other not) this feature is beneficial in terms of friction whereby the Poiseuille term reduces with K and, as shown by the earlier analysis, there is negligible effect by the Couette friction term.

If the bearing is fixed and so cannot tilt, the area of the bearing filled will lubricant will adjust by the film thickness changing to match the load support to that actually experienced.

For a half-wetted bearing (a bearing with one surface wetted by a lubricant and the other not) this feature is beneficial in terms of friction whereby the area of lubricant being sheared is reduced and, in the case of bearing geometry where the bearing is rounded in convex form such as a sinusoidal or partial spherical shape, the value of K will be reduced.

FIG. 4 shows the variation of friction coefficient with convergence ratio, K for a half-wetted bearing and a no-slip bearing (where both contact surfaces are wetted by the lubricant). The no-slip bearing defines an increase in friction coefficient with decreasing convergence ratio; conversely a half-wetted bearing shows characteristics that the friction coefficient decreases with convergence ratio. For a half-wetted bearing only the Poiseuille friction term is affected, as the Couette term, as demonstrated, is negligible.

FIG. 5 illustrates the effects of decreasing the inlet film thickness in relation to the convergence ratio. For both a no-slip and a half-wetted bearing there is a decrease in convergence ratio with decreasing film thickness. Combining the illustrated results of FIGS. 4 and 5 provides a relationship between the friction coefficient and inlet film thickness, as illustrated in FIG. 6, showing that friction in the half-wetted bearing reduces with a reduced inlet film thickness, in the no-slip case the converse occurs.

FIG. 6 further shows that the benefits of a half-wetting bearing prevail in low load applications, examples of which are systems in nano, micro and macro scale, particularly in micro-electromechanical systems (MEMs). Whilst both fully flooded and thin film lubrication is applicable to MEMs, it would be preferable to adopt a thin film of lubricant, typically 2 to 1000 nm thick, on the wetted surface to provide an efficient lubricant supply method. FIGS. 5 and 6 both indicate that low load contact enables a low convergence ratio bearing to operate with low Poiseuille friction.

A half-wetted bearing operating at very low loads may provide lubricant detachment in the diverging zone of the contact region, which inhibits the establishment of a negative pressure zone in the diverging zone which otherwise may impair load support. In the case of a no-slip bearing, negative pressures are generally negligible due to the positive pressures generated in the converging region being substantially greater. A half-wetted bearing also provides less capillarity than the fully wetted counterpart.

The half-wetted bearing may also be applicable for use in hard disc drives. A hard disc rotates at high speeds below an effectively stationary read-write head to form a lightly loaded contact region with two surfaces separated by a narrow gap of approximately 20 to 100 nm. The contact region is lubricated by air with a supplementary thin deposit of a polymeric fluorinated fluid at the hard disc surface to provide protection during starting and stopping, or when problems occur due to accidental air-film collapse. Information storage density in a hard disc is dependent on disc/read head separation, however as the gap defining the contact region narrows the load bearing capability of the entrapped air diminishes. A purely fluid lubricating contact region is unsuitable due to stiction arising from shear and capillarity forces. The example bearing schematically represented by FIG. 1 may be applicable where the wetted surface is defined by the moving hard disc surface and the stationary non-wetting surface being the read-write head to enable a zero-air gap to be combined with low friction.

FIG. 7 and FIG. 8 illustrate an example bearing for use in a micromachine such as a micromotor with a rotor 20. The rotor 20, attached to a rotating shaft (not shown) forms the non-wetting surface and is in the form of a flat circular flange made of stainless steel. The substantially non-wetting stator 19 is in the form of a circular thrust washer as shown in FIG. 7. In this example the stator 19 is fabricated from silicon with the contact surface being defined by sinusoidal variations 22 in the circumferential direction as illustrated by the cross-sectional view shown in FIG. 8 (shaped surfaces of silicon can be made by chemical-mechanical polishing. (CMP)). The roughness of the stator surface is less than 0.002-micron root mean square roughness measured using an upper cut-off length of 1 micron. More generally, the surface roughness should be less than 0.01 micron root mean square when measured with an upper cut-off length of 1 micron.

The stator surface 19 in contact with the lubricant is coated with a monolayer of octadecyltrichlorosilane to render it partially or fully non-wetting (standard chemical process techniques may be used to provide such coatings), such that it is lyophobic. Approximately 100 nm thick layer of 5-phenyl-4-ether liquid is deposited on the rotor surface 20 to serve as a lubricant thus forming a hydrodynamic film between the stator 19 and the rotor 20.

Alternatively the rotor 20 may be the non-wetting corresponding to the model illustrated in FIG. 3b. The silicon rotor 20 being coated as above rotating relative to a nickel stator 19

The lubricant of the example bearings may be provided by depositing a 10 nm thick layer of multialkylated cyclopentane fluid on the wetted surface to form a hydrodynamic film between the stator 19 and the rotor 20.

Furthermore the bearing as depicted by FIGS. 7 and 8 may be fully immersed in tetradecane liquid, which serves as a lubricant and forms a hydrodynamic film between the stator 19 and the rotor 20.

The sinusoidally varying surface of the stator in the example bearing of FIGS. 7 and 8 may be formed by overlay of the silicon surface by atomically smooth mica, adopting the form of the stator surface. The interface of the mica in contact with the lubricant requires further coating with a close packed monolayer of octadecyltriethyoxysiloxane to form a substantially non-wetting surface.

Coating the stator surface 19 with polyethylene tetrafluoride may provide the desired non-wetting properties. Full immersion in water serves as a lubricant in the contact region and forms a hydrodynamic film between the stator 19 and the rotor 20.

Alternatively the stator surface 20, at the interface with the lubricant, may have a surface finish defined by semi-spherical protrusions as illustrated in FIG. 9 with a variation in height illustrated by FIG. 10. Coating the stator surface 20 with octadecyltriethyoxysiloxane provides the desired non-wetting properties.

Using alumina as the contact surface in the stator 19 with semi-spherical protrusions as illustrated in FIGS. 9 and 10 provides a substantially non-wetting surface when coated with, for example, perfluorodecanetrichlorosiloxane. A layer of hydrocarbon fluid, approximately 100 nm thick, deposited on the rotor surface 20 serves as lubricant in the contact region and forms a hydrodynamic film between the stator 19 and the rotor 20.

The example bearing depicted in FIGS. 7 to 10 may be reproduced to provide a smaller scale bearing, say one-tenth scale or one hundredth scale to that illustrated, for use in micromachine systems such as a micromotor.

For application in a hard-disc drive assembly the read-write head forms part of the non-wetted surface of, for example an alumina tilted pad thrust bearing loaded against the information storage surface of the rotating hard-disc.

Dimensions which may be suitable for such an application would be an alumina pad of length, 2 mm and width, 1 mm adopting a flat surface on the rotor face with less than 2 nm root mean square roughness measured using an upper cut-off length of 1 micron on the stator face 19. Coating the surface with perfluorodecanetrichlorosiloxane may provide non-wetting properties. A thin film of perfluoropolyether or a hydrocarbon lubricant serves as lubricant in the contact region and forms a hydrodynamic film between the stator 19 and the rotor 20.

An example journal bearing for a micromachine provides a rotor 20 in the form of a stainless steel shaft of 1 mm diameter rotating relative to a stator 19 formed by a semi-circular slot of diameter 1.1 mm. Coating the stator surface with PTFE provides non-wetting properties in this specific example. A deposit of 5-phenyl-4-ether fluid on the rotor (shaft) 20 serves as lubricant in the contact region and forms a hydrodynamic film between the stator 19 and the rotor 20.

REFERENCE

1. CHAPPUIS, J., (1982) "Lubrication by a new principle: the use of non-wetting liquids" *Wear* 77 pp 303-313.
2. HIRATSUKA, K., BOHNO, A. & KUROSAWA, M. (2000) "Ultra-low friction between water droplet and hydrophobic surface" *Fundamentals of Tribology and Bridging the Gap between Macro and Micro/Nanoscales* pp 345-348.
3. HILD, W., SCHAEFER, J. A., & SCHERGE, M. (2002) "Microhydrodynamical studies of hydrophilic and hydrophobic surfaces." *Proceedings of 13$^{th}$ International Collooq. Tribology Esslingen*, pp 821-825 ed W. J. Bartz.
4. DOWSON, D., (1962) "A generalised Reynolds Equation for fluid film lubrication." *Int. J. Mech. Sci.* 4 pp 159-170
CAMERON, A., (1966) "The principles of lubrication" *Publ. Longmans, London*

The invention claimed is:

1. A bearing comprising:
a first bearing surface;
a second bearing surface separated from said first bearing surface by a gap, said gap having a convergent region and containing fluid, wherein, said first bearing surface moves relative to said convergent region so as to entrain said fluid into movement towards said convergent region and wherein said second bearing surface slips relative to said fluid and pressure within said fluid between said first bearing surface and said second bearing surface supports a load applied between said first bearing surface and said second bearing surface.

2. A bearing as claimed in claim 1, wherein said second bearing surface is substantially non-wetted by said fluid.

3. A bearing as claimed in claim 1, wherein said first bearing surface is wetted by said fluid.

4. A bearing as claimed claim 1, wherein said fluid is an oil and said first bearing surface is oleophilic.

5. A bearing as claimed in claim 1, wherein said fluid is an oil and said second bearing surface is oleophobic.

6. A bearing as claimed in claim 1, wherein said fluid is a film of fluid disposed upon said first bearing surface.

7. A bearing as claimed in claim 6, wherein said second bearing surface is part of a data access head operable to access data stored on a movable data storage media, said first bearing surface being a surface of said data storage media.

8. A bearing as claimed in claim 7, wherein said movable data storage media is a magnetic disc and said data access head is a magnetic disc data access head.

9. A bearing as claimed in claim 1, wherein said bearing is immersed in said fluid.

10. A bearing as claimed in claim 1, wherein said bearing is part of an electromechanical system, said first surface being part of a moving first component and said second surface being part of a stationary second component.

11. A bearing as claimed in claim 10, wherein the electromechanical system is a microelectromechanical system.

12. A bearing as claimed in claim 1, wherein said first surface has a surface energy of greater than 0.05 J/m$^2$.

13. A bearing as claimed in claim 1, wherein said second surface has a surface energy of less than 0.05 J/m$^2$.

14. A bearing as claimed in claim 1, wherein said first surface is one of;
a metal; and
a ceramic.

15. A bearing as claimed in claim 1, wherein said second surface is one of;
a polymer;
a fluorinated surfactant coating; and
a hydrocarbon surfactant coating.

16. A bearing as claimed in claim 1, wherein said second bearing surface has a surface roughness less than 0.01 micron root mean square when measured with an upper cut-off length of 1 micron.

17. A bearing as claimed in claim 1, wherein said fluid has a surface tension higher than a critical surface tension of said second bearing surface.

18. A bearing as claimed in claim 1, wherein said fluid is one of;
water;
glycerol;
an ionic liquid; and
a synthetic lubricant.

19. A bearing as claimed in claim 18, wherein said synthetic lubricant is an ester.

20. A bearing as claimed in claim 18, wherein said synthetic lubricant is an ether.

21. A bearing as claimed in claim 1, wherein said first bearing surface and said second bearing surface is one of;
a bulk material;
a surface treatment; and
a coating.

22. A bearing as claimed in claim 1, wherein said fluid contains an additive to form a non-wetting film at the second bearing surface.

23. A bearing comprising:
a fluid slippage surface;
a fluid entrainment surface separated by a gap from said fluid slippage surface, said gap having a convergent region and an intermediate lubricant fluid therein, said intermediate lubricant fluid adhering at a first interface to said fluid entrainment surface and non-adhering at a second interface to said fluid slippage surface, wherein movement of said fluid entrainment surface towards said convergent region generates an increased pressure in said fluid in said convergent region.

24. A bearing as claimed in claim 23, wherein movement of said fluid entrainment surface entrains said lubricant layer into said convergent region so as to generate a pressure within said intermediate lubricant layer for supporting a load.

25. A bearing as claimed in claim 24, wherein movement of said fluid entrainment surface results in slipping between said second interface of said intermediate lubricant layer and said fluid slippage surface.

26. A method of supporting a first surface by a second surface for relative movement with reduced friction, said method comprising the steps of:
- providing a fluid;
- providing said first surface with a fluid entrainment capability with respect to said fluid;
- providing said second surface with a fluid slippage capability with respect to said fluid;
- locating said surfaces so as to define a gap therebetween with said fluid located in said gap and said gap having a convergent portion; and
- moving said first surface towards said convergent portion of said gap thereby generating a pressure in said fluid, said pressure acting upon both surfaces.

27. A bearing for supporting a first bearing portion by a second bearing portion for relative movement with reduced friction, said bearing comprising:
- a fluid;
- a first surface on said first bearing portion, said first surface having a fluid entrainment capability with respect to said fluid;
- a second surface on said second bearing portion, said second surface having a fluid slippage capability with respect to said fluid, said second surface defining a gap between said surfaces, wherein said gap includes a convergent portion and wherein said fluid is located in said gap, wherein, during relative movement of said first surface towards said convergent portion, said surfaces and said fluid comprise a means for generating an increased pressure in said fluid in the region of said convergent portion of said gap.

* * * * *